US011291200B2

(12) United States Patent
Guo et al.

(10) Patent No.: US 11,291,200 B2
(45) Date of Patent: Apr. 5, 2022

(54) APPLICATION OF VIABLE CELL MONITOR TO CRYOPRESERVATION OF PLANT CELLS

(71) Applicant: EAST CHINA UNIVERSITY OF SCIENCE AND TECHNOLOGY, Shanghai (CN)

(72) Inventors: Meijin Guo, Shanghai (CN); Jiarui Li, Shanghai (CN); Zejian Wang, Shanghai (CN); Yuxia Chen, Shanghai (CN); Yingping Zhuang, Shanghai (CN)

(73) Assignee: EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 305 days.

(21) Appl. No.: 16/347,429

(22) PCT Filed: Nov. 22, 2017

(86) PCT No.: PCT/CN2017/112299
§ 371 (c)(1),
(2) Date: May 3, 2019

(87) PCT Pub. No.: WO2018/095323
PCT Pub. Date: May 31, 2018

(65) Prior Publication Data
US 2019/0274299 A1 Sep. 12, 2019

(30) Foreign Application Priority Data
Nov. 22, 2016 (CN) .......................... 201611041562.6

(51) Int. Cl.
A01N 1/02 (2006.01)
G01N 27/22 (2006.01)

(52) U.S. Cl.
CPC ........... *A01N 1/0221* (2013.01); *G01N 27/22* (2013.01)

(58) Field of Classification Search
None
See application file for complete search history.

(56) References Cited

FOREIGN PATENT DOCUMENTS

| CN | 101971799 A | 2/2011 |
|---|---|---|
| CN | 102480935 A | 5/2012 |

(Continued)

OTHER PUBLICATIONS

Yu Liu, "On-line Monitoring of the Aggregate Size Distribution of Carthamus Tinctorius L. Cells with Multi-Frequency Capacitance Masurements", Royal Society of Chemistry, Published Sep. 15, 2016.

(Continued)

*Primary Examiner* — David W Berke-Schlessel
(74) *Attorney, Agent, or Firm* — Dinsmore & Shohl LLP

(57) ABSTRACT

The present disclosure relates to the application of a viable cell monitor to the cryopreservation of plant cells. The viable cell monitor is, for the first time, used in a method for rapidly evaluating the effect of cell freezing-preservation. The effect of a cryoprotectant on cell preservation is evaluated through the change in the capacitance of viable cells before and after cell freezing and resuscitation. Viable cell electrodes can provide a quick and accurate characterization of viable cell concentrations. Combining the viable cell capacitance with the detection result of 2,3,4-triphenyl tetrazolium chloride (TTC), a rapid and quantitative evaluation of the effect of a freezing method on cell preservation can be achieved, thus overcoming the low effectiveness and non-quantification of previous cell preservation methods. Compared with traditional methods, the method of the present (Continued)

disclosure can improve the comprehensive score of cell cryopreservation by 5 times or more.

12 Claims, 1 Drawing Sheet

(56) References Cited

FOREIGN PATENT DOCUMENTS

| | | |
|---|---|---|
| CN | 103283716 A | 9/2013 |
| CN | 103478118 A | 1/2014 |
| CN | 104585165 A | 5/2015 |
| CN | 105432597 A | 3/2016 |
| WO | WO-9639812 A2 * 12/1996 | ............... A01N 3/00 |

OTHER PUBLICATIONS

Liu, "Cryopreservation of Test Tube Shoot Tips of Siraitia Grosvenorii by Vitrification and Plant Regeneration", Chinese Traditional and Herbal Drugs, vol. 40, Issue 2 (2009) 293.

Chen, Qi. Study on Cryopreservation Technology of Potato Stem Tip by Vitrification. Heilongjiang Agricultural Sciences. Aug. 31, 2014. No. 8, p. 13.

Yin, Zengfang et al. The Study on the Storage Conditions of Liriodendron Chinese Sarg Pollen. Journal of Jiangsu Forestry Science and Technology. Jun. 30, 1997. No. 02.

Liu, Huaying et al. Cryopreservation of Test-Tube Shoot Tips of Siraitia Grosvenorii by Vitrification and Plant Regeneration. Chinese Traditional and Herbal Drugs. Feb. 12, 2009. No 02.

International Search Report dated Feb. 7, 2018 related to PCT/CN2017/112299 filed Nov. 22, 2017.

* cited by examiner

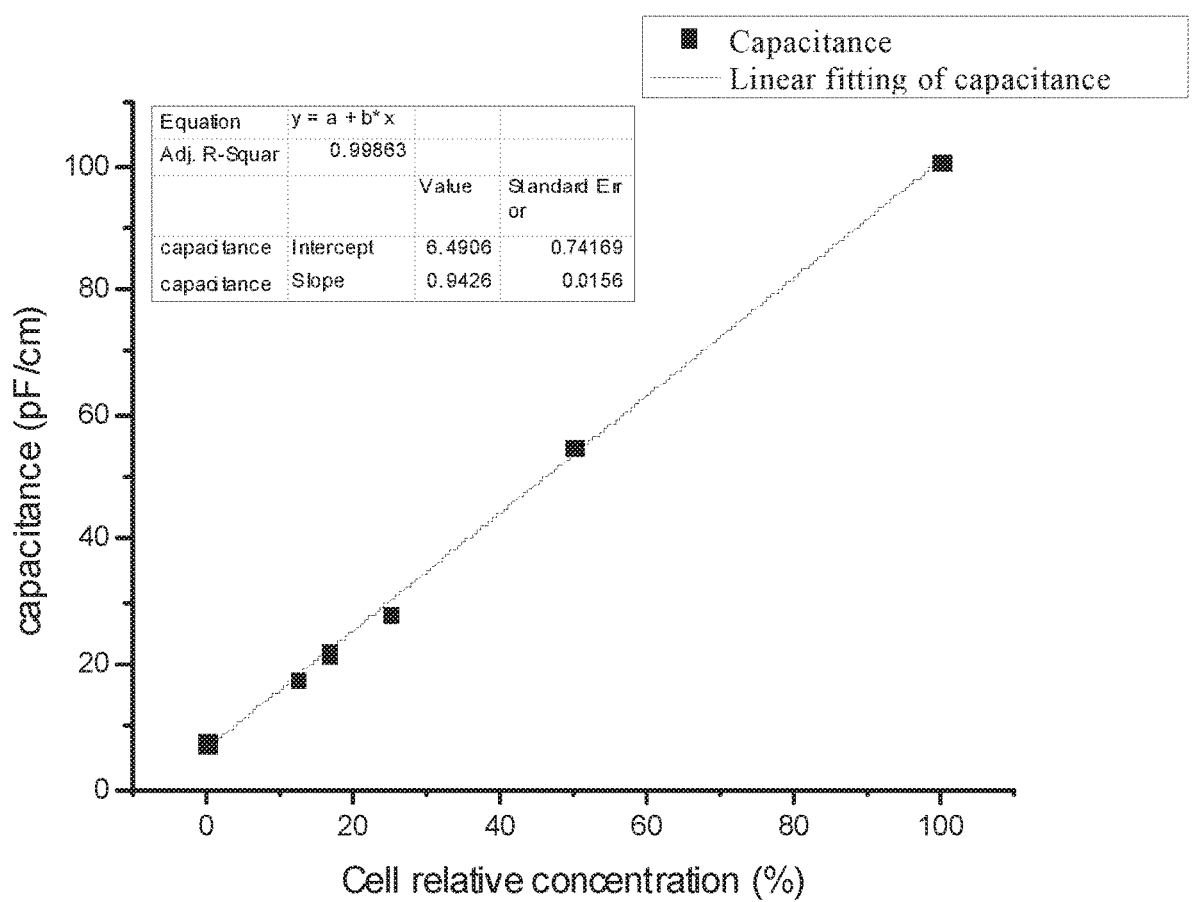

APPLICATION OF VIABLE CELL MONITOR TO CRYOPRESERVATION OF PLANT CELLS

CROSS-REFERENCE TO RELATED APPLICATION

The present application is the National Phase entry of International Patent Application No. PCT/CN2017/112299 filed on Nov. 22, 2017, which claims priority to Chinese Patent Application No. CN201611041562.6, filed on Nov. 22, 2017, the entire contents of both of which are hereby incorporated by reference into this application.

TECHNICAL FIELD

The present disclosure directs to the field of cell detection, and more particularly, the present disclosure relates to the application of a viable cell monitor to plant cell cryopreservation.

BACKGROUND

The existing preservations of plant cell lines are mainly performed through the following two ways. The first is performing succeeding preservation in a growth medium and the other is performing cell freezing-preservation under cryogenic temperature. The long-term succeeding preservation of cells has disadvantages such as time and energy consuming, expensive, and plant cell characteristic disappearing. When under cryogenic conditions, cells stop a series of internal metabolic activities and are capable of maintaining their own characteristics, greatly reducing the risk of cell characteristic disappearing. However, for plant cell cryopreservation, the freezing-preservation method plays a decisive role in successful cell preservation. Plant cells contain a lot of water, which brings difficulties to freezing-preservation. Therefore, there is a need for methods to select suitable cryoprotectants, and to develop the appropriate freezing-preservation, so as to control cell damages caused by intracellular water and the freezing process in a most effective manner, as well as to obtain a higher cell viability after the freezing-preservation.

In the process of plant cell freezing-preservation, cell rupture will be caused by the formation of ice crystals of intracellular or extracellular water. In the past, a method determining cell mitochondrial activity was used to indirectly reflect the activity of cells after freezing-preservation. However, this determination makes manipulation cumbersome, processing condition complicated and be time-consuming, resulting in difficulties in actual operation.

A viable cell monitor makes use of capacitive method to measure the concentration of viable cells in a cell solution. The alternating electric field in the cell solution causes the ions inside to migrate, while viable cells have a complete, insulating cell membrane in which the ions are bound to polarize the cell membrane, making each cell a tiny capacitor. There is a good linear relationship between the measured capacitance and the number of cells in the solution. Currently, the viable cell monitor, which is often used in the fermentation process to measure the number of cells in the fermentation broth, has not been applied to cell freezing-preservation.

SUMMARY

The object of the present disclosure is to provide the application of a viable cell monitor to plant cell cryopreservation.

In the first aspect of the present disclosure, provided is a method for increasing cell viability of freezing-preserved cells, comprising:

(1) pre-treating plant cells in the logarithmic growth phase with 0.15 to 0.3 M sucrose as a pre-treatment agent;

(2) adding the cells into a cryoprotectant containing medium and carrying out cryopreservation; the cryoprotectants are DMSO and sucrose, and the final concentration in the medium is:

DMSO: 8-12% (w/v) or 9-11% (w/v);

and sucrose: 8-12% (w/v) or 9-11% (w/v).

In some embodiments, step (1) of the method further comprises: measuring and recording capacitance $A_1$ of the pre-treated cells;

step (2) further comprises performing cell resuscitation on the plant cells after freezing-preservation, and measuring and recording capacitance $A_2$ by using a viable cell monitor;

the basic capacitance of the cells is denoted as $A_3$ and the cell viability preservation rate is obtained according to equation (I):

$$\text{Cell viability preservation rate} = (A_2 - A_1)/(A_3 - A_1) \quad \text{(I); and}$$

the cell viability of the plant cells is evaluated according to the resulting cell viability preservation rate.

In other embodiments, the plant cells are plant cells from *Siraitia grosvenorii*, such as callus cells from *Siraitia grosvenorii*.

In some embodiments, in step (1) of the method, the sucrose is present in a liquid medium, and the plant cells in the logarithmic growth phase are added to the liquid medium for the pre-treatment.

In some embodiments, in step (1) of the method, the concentration of sucrose is 0.18-0.22 M or 0.2 M, when the sucrose is used as a pre-treatment agent.

In another embodiment, in the method, the pre-treatment is performed for from 1 to 46 h, from 5 to 22 h, or from 8 to 10 h; the pre-treatment temperature is 25±2° C.; and the rotary speed used in the pre-treatment is 110±20 rpm, or 110±10 rpm.

In some embodiments, the cryopreservation means freezing-preservation.

In some embodiments, the method further comprises, after step (1), separating the pre-treated cells; such as by separating the pre-treated cells by centrifugation; or in step (2), after adding the cells to the cryoprotectant containing medium, the steps of cryopreservation, including:

(i) cell incubation: incubating at 110±20 rpm or at 110±10 rpm under 0-4° C. for 45±10 min or for 45±5 min; and (ii) preserving at −20±2° C. for 40±10 min or for 40±5 min before preserving at −80° C.±10° C. or at −80° C.±5° C.

In other embodiments, the medium in the method comprises: an MS medium, 30±5 g/L sucrose, 1.0±0.2 mg/L 6-BA, and 0.5±0.1 mg/L NAA+100±10 mg/L inositol. In some embodiments, the medium is a liquid medium.

In another aspect of the present disclosure, provided is a method for rapidly evaluating cell viability of plant cells, comprising:

(a) performing freezing-preservation on the plant cells, then measuring and recording capacitance $A_1$ before the freezing-preservation;

(b) performing cell resuscitation on the plant cells after freezing-preservation, and measuring and recording capacitance $A_2$ by using a viable cell monitor;

(c) denoting the basic capacitance of the cells as $A_3$ and obtaining the cell viability preservation rate according to equation (I):

$$\text{Cell viability preservation rate} = (A_2 - A_1)/(A_3 - A_1) \quad \text{(I); and}$$

(d) evaluating the cell viability of the plant cells according to the cell viability preservation rate obtained from (c).

In some embodiments, the plant cells are callus cells from *Siraitia grosvenorii*.

In some embodiments, the higher the cell viability preservation rate, the better the cell viability. For example, the above cell viability preservation rate is higher than 30%, higher than 40%, higher than 50% or higher.

In some embodiments, the detection result of 2,3,4-triphenyl tetrazolium chloride (TTC) is also taken into consideration in conjunction with the determination of cell viability preservation rate mentioned above.

Other aspects of the present disclosure will be apparent to those skilled in the art from the disclosure herein.

BRIEF DESCRIPTION OF THE DRAWINGS

FIG. 1 shows the linear relationship between viable cell capacitance and cell concentration.

DETAILED DESCRIPTION OF EMBODIMENTS

The present inventors have used, for the first time, a viable cell monitor as a tool to rapidly evaluate the effect of cell freezing-preservation. The effect of cryoprotectants on cell preservation is evaluated through changes in the capacitance of viable cells before and after cell freezing and resuscitation. Viable cell electrodes provide a quick and accurate characterization of viable cell concentrations. Combining the viable cell capacitance with the detection result of TTC, a rapid evaluation of the effect of a freezing method on cell preservation can be achieved.

In addition, according to the measurement and analysis using the viable cell monitor, the present inventors have developed the freezing-preservation method of plant cells and found conditions and methods for performing freezing-preservation.

Application of a Viable Cell Monitor to Cell Cryopreservation Evaluation

The existing methods for evaluating cell viability rate after cryopreservation are mainly methods such as growth resuscitation method and TTC value determination method. The growth resuscitation method is to recover cells and make statistics on cell viability after resuscitating the cells. However, the recovery growth of plant cells generally requires a relatively long period, usually more than three weeks, and may even be up to two months for some cells, causing the plant cells to take a long time to establish the preservation method. Furthermore, the TTC method mainly utilizes formazan substances reduced to red by intracellular dehydrogenase to realize the cell coloration, thus used for the detection of intracellular mitochondrial activity. However, this method is difficult to distinguish with cell death caused by cell membrane damage in the process of freezing-preservation, resulting in a substantial increase in the reliability of the measured data.

Existing methods for evaluating cell cryopreservation are too time consuming and less sensitive, which is not conducive to the establishment of cell preservation methods. By using the viable cell monitor, the methods of the present disclosure enable the detection of the viable cell capacitance before and after the cryopreservation of plant cells, thus obtaining the effect of the cryopreservation method on the viability preservation rate of plant cells after cryopreservation. The type of pre-treatment agents, the pre-treatment time and the type of cryoprotectants in the freezing-preservation method can be rapidly screened. By evaluating the cell freezing method rapidly, the survival rate of plant cells after cryopreservation can be improved, and the operation is simple, the time is shortened and the efficiency is improved.

The described viable cell monitor is, for example, Type 2801-00 or 220 from Aber Inc.

Cryopreservation of Plant Cells

Making use of the above-established method for measuring the plant cell activity after cryopreservation with the viable cell monitor, the various aspects of the plant cell cryopreservation method, including the cryoprotectant, the freezing conditions, operating procedures, etc. were developed.

Existing osmotic cryoprotectants, including a class that can penetrate into cells, are generally small molecules substances, including mainly glycerol, DMSO, ethylene glycol, propylene glycol, acetamide, methanol, etc.; and a class of non-osmotic cryoprotectants that cannot penetrate into cells and are usually some macromolecular substances, including polyvinylpyrrolidone (PVP), sucrose, polyethylene glycol, dextran, albumin, hydroxyethyl starch, etc.

The mixed use of osmotic and non-osmotic cryoprotectants not only can dehydrate cells, but also can better control the formation of ice crystals inside and outside cells and the shape of the ice crystals, preventing the generation of sharp ice crystals to puncture the cells and playing a protective role for the cells. Therefore, after repeated studies, the present inventors developed a liquid medium+DMSO+sucrose, together with a formulation containing both osmotic and non-osmotic cryoprotectants for the cryopreservation of plant cells.

In embodiments of the present disclosure, a viable cell monitor may be used to establish a rapid evaluation system of the survival rate of callus cells from *Siraitia grosvenorii* during rapid freezing-preservation under cryogenic temperature. The methods of the present disclosure utilize a viable cell sensor to detect the viable cell capacitance before and after cryopreservation so as to rapidly obtain the viable cell survival rate after the cryopreservation method, achieving the effect evaluation of the particular preservation method in a short period of time. Thus, the method for cryopreservation of plant cells can be quickly established, with the time shortened and the efficiency improved.

Based on the new findings, provided is a method for increasing cell viability of freezing-preserved cells, comprising: (1) pre-treating plant cells in the logarithmic growth phase with 0.15 to 0.3 M sucrose as a pre-treatment agent; (2) adding the cells into a cryoprotectant containing medium and carrying out cryopreservation, wherein the cryoprotectants are DMSO and sucrose, and the final concentration in the medium is: DMSO: 8-12% (w/v), and sucrose: 8-12% (w/v). In some embodiments, the final concentration in the medium is: DMSO: 9-11% (w/v), and sucrose: 9-11% (w/v).

In the freezing process, the cell viability can be measured to know the change of cell activity as required. Therefore, step (1) further comprises: measuring and recording capacitance $A_1$ of the pre-treated cells; step (2) further comprises performing cell resuscitation on the plant cells after freezing-preservation, and measuring and recording capacitance $A_2$ by using a viable cell monitor; the basic capacitance of the cells is denoted as $A_3$ and the cell viability preservation rate is obtained according to equation (I):

$$\text{Cell viability preservation rate} = (A_2 - A_1)/(A_3 - A_1) \quad \text{(I); and}$$

the cell viability of the plant cells is evaluated according to the resulting cell viability preservation rate.

The plant cells of the present disclosure can be a variety of plant cells, including callus cells thereof. In some embodiments, the plant cells are plant cells from *Siraitia grosvenorii*, such as callus cells from *Siraitia grosvenorii*.

After determining and analysing, the present inventors further developed the method of pre-treatment. The sucrose is present in a liquid medium, and the plant cells in the logarithmic growth phase are added to the liquid medium for the pre-treatment. The concentration of sucrose in the pre-treatment is 0.18 to 0.22 M; or 0.2 M. In some embodiments, after the pre-treatment, the method further comprises: separating the pre-treated cells; such as by separating the pre-treated cells by centrifugation.

In some embodiments, the pre-treatment time is from 1 to 46 h, from 5 to 22 h, or from 8 to 10 h.

In some embodiments, the pre-treatment temperature is 25±2° C.; the rotary speed used in the pre-treatment is 110±20 rpm or 110±10 rpm.

In some embodiments, after adding the cells to the cryoprotectant containing medium, the steps of cryopreservation include: (i) cell incubation: incubating at 110±20 rpm (or at 110±10 rpm) under 0-4° C. for 45±10 min (or for 45±5 min); (ii) preserving at −20±2° C. for 40±10 min (or for 40±5 min) before preserving at −80° C.±10° C. (or at −80° C.±5° C.).

The present disclosure is further described in conjunction with particular examples. It is to be understood that these examples are merely illustrative of the present disclosure rather than limiting the scope of the present disclosure. The experimental methods not specified for the specific conditions in the following examples are generally carried out in accordance with conventional conditions, such as the conditions described in J. Sambrook et al. (eds.), Molecular Cloning: A Laboratory Manual, 3rd Edition, Science Press, 2002, or in accordance with the conditions recommended by the manufacturer.

1.1 Strains and Media

Strains: suspension cells from *Siraitia grosvenorii*: selecting seed embryos from *Siraitia grosvenorii* to induce loose embryogenic calli, after subculture and screening, taking good growth, uniform callus, which is inoculated into a liquid medium for suspension culture to obtain a homogeneous suspension cell line.

Semi-solid medium: an MS medium+30 g/L sucrose+1.0 mg/L 6-BA+0.5 mg/L NAA+100 mg/L inositol+4.6 g/L agar.

Liquid medium: an MS medium+30 g/L sucrose+1.0 mg/L 6-BA+0.5 mg/L NAA+100 mg/L inositol.

Pre-treatment fluid: liquid medium+sucrose (0.2 to 0.5 M)/trehalose (0.2 to 0.5 M).

Cryoprotectant containing medium: liquid medium+DMSO (5% to 10%)+sucrose (5% to 10%)/sorbitol (5% to 10%).

1.2 Instruments and Reagents

Instruments: a viable cell monitor (a viable cell concentration analyser, available from Aber Inc., 2801-00), a −80° C. cryogenic refrigerator and a rotary shaker.

Reagents: DMSO (dimethyl sulfoxide), sucrose, sorbitol, trehalose: Shanghai Aladdin Bio-Chem Technology Co., LTD.

1.3 Cell Cryopreservation Methods 1.3.1 Pre-Treatment

Taking a certain number of cells in the logarithmic growth phase for centrifugation (or sedimentation) and adding an equal amount of pre-treatment fluids after removing the supernatant. Pre-treating at 110 rpm under 25° C. for 18 h.

1.3.2 Incubation

Pre-treated cells are centrifuged. Adding cryoprotectants after removing the supernatant and incubating at 0-4° C. and 110 rpm for 45 min.

1.3.3 Freezing

After incubation, the cells are first cooled at −20° C. for 40 min and then cooled in the −80° C. cryogenic refrigerator.

1.3.4 Resuscitation

Frozen cells are thawed in a water bath at 39° C., for 2-3 min. After the ice in the centrifuge tube is completely dissolved, removing cryoprotectants that have some toxicity after centrifugation and washing three times with pre-treatment fluids.

1.4 Determination Method (1) Cell Viability Evaluation Method

Mixing evenly the suspension cells and then measuring the capacitance of viable cells with a viable cell monitor. The viable cell capacitance of the pre-treated cell is denoted as $A_1$; the viable cell capacitance after resuscitation is denoted as $A_2$; and the basal capacitance of the cell is denoted as $A_3$ (capacitance when cell death totally). Cell viability preservation rate=$(A_2-A_1)/(A_3-A_1)$.

The basic capacitance of cells: the cell suspension is boiled in boiling water for 1 h, and then subjected to ultrasonication for 40 min. The capacitance measured is the basic capacitance.

(2) Measurement of Mitochondrial Activity

After the suspension cells are filtered off through a 8 μm filter membrane, 100 mg of freshly weighed cells are added with 2.5 mL of 0.4% 2,3,4-triphenyl tetrazolium chloride (TTC) solution and 2.5 mL of 0.05 mol/L (pH 7.5) $Na_2HPO_4$—$NaH_2PO_4$ phosphate buffer respectively. After mixing evenly, performing dark culture at 25° C. for 16 h. After the dark culture, the supernatant is removed by centrifugation and the cells are washed with distilled water three times. Adding with 4 mL of methanol and placing in a 60° C. water bath for 50 min, gently blow twice with a pipette tip until the cells have detached to colourless. After still standing at room temperature, the supernatant is centrifuged at 4000 rpm for 5 minutes and the absorbance is measured at 485 nm to indirectly reflect cell viability.

Example 1. The Linear Relationship Between Viable Cell Capacitance and Cell Concentration Take cells in the logarithmic growth phase as initial cells. The cells are diluted 2, 4, 6, and 8 times, and the capacitance is measured by a viable cell monitor, respectively.

The results are shown in FIG. 1. It can be seen from FIG. 1 that there is a good linear relationship between the capacitance of viable cells and cell concentration. The capacitance of cells in the logarithmic growth phase is about 100 pF/cm, whereas only in medium solution, there is a basic capacitance that is about 7 pF/cm. After the cells are dead totally, the difference between capacitance and the medium basic capacitance is not so large, which has also been proved in subsequent experiments.

From the results of FIG. 1, it can be concluded that the viable cell capacitance can well characterize the concentration of viable cells, which also provides the basis for subsequent experiments.

Example 2. Effect of Different Types of Cryoprotectants on Cells after Cryopreservation Glycerol, DMSO, sucrose, sorbitol, etc. have been used as cryoprotectants. Among them, glycerol and DMSO are osmotic cryoprotectants, whereas sucrose and sorbitol are non-osmotic cryoprotectants. This example discusses how to select a cryoprotectant and what concentration to choose to obtain the most excellent protective effect.

Studies are carried out by mixing different concentrations of DMSO (5%, 10%) with sucrose (5%, 10%) and sorbitol (5%, 10%) as cryoprotectants respectively. After pre-treated with a liquid medium containing 0.35 M sucrose for 18 h, the cells are centrifuged and the supernatant are removed before adding cryoprotectants. Then, incubate at 110 rpm at 0 to 4° C. for 45 min. After incubation, the cells are first cooled at −20° C. for 40 min and then cooled in the −80° C. cryogenic refrigerator for 24 h. The viability of the cells after cryopreservation is measured. Grouping is as shown in Table 1, wherein cells in Group 9 are pre-treated cells without adding cryoprotectant.

The effect of cryoprotectants on cell viability after cryopreservation is shown in Table 1.

TABLE 1

The effect of cryoprotectants on cell viability after cryopreservation

| Group | DMSO | Sucrose | Sorbitol | A1 pF/cm | A2 pF/cm | A3 pF/cm | Viability preservation rate | TTC value/ 100 mg of cells |
|---|---|---|---|---|---|---|---|---|
| 1 | 5% | 5% | 0 | 31.64 | 15.54 | 8.62 | 30.06% | 0.339 |
| 2 | 5% | 10% | 0 | 31.79 | 19.04 | 8.64 | 44.92% | 0.835 |
| 3 | 10% | 5% | 0 | 32.41 | 16.47 | 8.89 | 32.23% | 0.672 |
| 4 | 10% | 10% | 0 | 30.35 | 17.55 | 8.64 | 41.04% | 0.859 |
| 5 | 5% | 0 | 5% | 27.99 | 14.25 | 8.62 | 29.07% | 0.612 |
| 6 | 5% | 0 | 10% | 31.13 | 17.64 | 8.82 | 39.53% | 0.746 |
| 7 | 10% | 0 | 5% | 31.75 | 16.49 | 8.86 | 33.33% | 0.691 |
| 8 | 10% | 0 | 10% | 31.43 | 18.27 | 8.83 | 41.77% | 0.945 |
| 9 | 0 | 0 | 0 | 33.95 | 11.24 | 7.95 | 12.65% | 0.187 |

From the experimental results, it can be seen that the viabilities of cells added with cryoprotectants are much higher than that of the cells without cryoprotectants, both in terms of the viable cell capacitance and mitochondrial activity. From the viable cell capacitance level, it can be seen that cell viability preservation rates have greatly improved than that in the control group. And there is also a good correspondence between viable cell capacitances and TTC values. Therefore, the preservation rate of cell viability can reflect the viability of cells after freezing-preservation.

Capacitance and TTC value of viable cells at each level of DMSO, sucrose and sorbitol are statistically analysed, and the TTC value and the viable cell capacitance at each level are comprehensively scored. The effect of each level of cryoprotectant on the cell activity after cryopreservation is shown in Table 2.

TABLE 2

The effect of each level of cryoprotectant on the cell activity after cryopreservation

| Cryoprotectant | Viability preservation rate score | TTC value score | Comprehensive score |
|---|---|---|---|
| 5% sucrose | 31.15% | 0.506 | 13.215 |
| 10% sucrose | 42.98% | 0.847 | 20.000 |
| 5% sorbitol | 31.20% | 0.652 | 14.951 |
| 10% sorbitol | 40.65% | 0.846 | 19.441 |
| 5% DMSO | 35.90% | 0.633 | 15.825 |
| 10% DMSO | 37.09% | 0.792 | 17.978 |

Note:
TTC value score = TTC value/maximum TTC value × 10;
Viability preservation rate score = viability preservation rate/maximum viability preservation rate × 10;
Comprehensive score = TTC value score + viability preservation rate score.

It can be seen from the results in Table 2 that the effect of 10% DMSO is superior to that of 5% DMSO in cells after cryopreservation. For sorbitol and sucrose, the 10% content is the best for cell cryopreservation, regardless of the viable cell capacitance or the TTC value.

After comprehensive scoring, the cryoprotectant composition which is better for cell cryopreservation is: a cell growth medium (a liquid medium)+10% DMSO+10% sucrose. Compared with pre-treated cells without adding cryoprotectant, cells under the above condition have the cell viability preservation and the mitochondrial activity (TTC value) increased by 224.43% and 372.16%, respectively.

Example 3. Effect of Different Types of Pre-Treatment Agent on Cell Cryopreservation The type and the concentration of pre-treatment agent have different effects on cell cryopreservation. When the concentration of pre-treatment agent is too high, the dehydration effect is better, however, the high concentration of pre-treatment agent has a greater damage to cells. On the basis of the previous experiments, sucrose of 0.2 M, 0.35 M, and 0.5 M and trehalose of 0.2 M, 0.35 M, and 0.5 M are selected for investigation. The control cells are directly frozen-preserved without pre-treatment. The freezing-preservation time is all: after placing at −20° C. for 40 min, preserving at −80° C. for 24 h; the frozen medium is all: a cell growth medium (a liquid medium)+10% DMSO+10% sucrose; then carry out a resuscitating determination.

The experimental results are shown in Table 3.

TABLE 3

The effects of various types and concentrations of pre-treatment agent on cell viability after cryopreservation

| Group | Pre-treatment agent | A1 pF/cm | A2 pF/cm | A3 pF/cm | Viability preservation rate | TTC value/ 100 mg of cells | Comprehensive score |
|---|---|---|---|---|---|---|---|
| 1 | Sucrose 0.2M | 42.25 | 26.44 | 10.00 | 50.98% | 0.916 | 20.000 |
| 2 | Sucrose 0.35M | 30.55 | 17.01 | 8.49 | 38.62% | 0.479 | 12.805 |
| 3 | Sucrose 0.5M | 24.62 | 11.81 | 6.03 | 31.09% | 0.232 | 8.632 |
| 4 | Trehalose 0.2M | 41.05 | 23.40 | 7.77 | 46.97% | 0.767 | 17.586 |

TABLE 3-continued

The effects of various types and concentrations of pre-treatment agent on cell viability after cryopreservation

| Group | Pre-treatment agent | A1 pF/cm | A2 pF/cm | A3 pF/cm | Viability preservation rate | TTC value/ 100 mg of cells | Comprehensive score |
|---|---|---|---|---|---|---|---|
| 5 | Trehalose 0.35M | 34.06 | 18.80 | 7.09 | 43.42% | 0.841 | 17.698 |
| 6 | Trehalose 0.5M | 21.20 | 10.65 | 5.50 | 32.80% | 0.224 | 8.880 |
| 7 | Control | 54.85 | 29.40 | 12.81 | 39.46% | 0.670 | 15.055 |

Note:
TTC value score = TTC value/maximum TTC value × 10; Viability preservation rate score = viability preservation rate/maximum viability preservation rate × 10; Comprehensive score = TTC value score + viability preservation rate score.

The experimental results have showed that compared with the control, the cells that are pre-treated with 0.2 M sucrose as a pre-treatment agent and then cryopreserved with a cell growth medium (a liquid medium)+10% DMSO+10% sucrose as a cryoprotectant are significantly increased in cell viability preservation rate and mitochondrial activity (TTC value), which increased by 29.18% and 36.72% respectively.

Example 4. Effect of Pre-Treatment Time on Cell Cryopreservation

The pre-treatment time has similar principle to a pre-treatment agent in exerting effects on the activity of cells after freezing-preservation. If the cells are treated for too long under the condition with a certain osmotic pressure, excessive dehydration of the cells may be caused, greatly reducing activity in the pre-treatment phase and thus affecting the activity of resuscitated cells after freezing-preservation. On the basis of the previous experiments, use 0.2 M sucrose as a pre-treatment agent and carry out the investigation with the pre-treatment time of 0 h, 1 h, 2 h, 5 h, 9 h, 22 h and 46 h respectively. The freezing-preservation condition is: after placing at −20° C. for 40 min, preserving at −80° C. for 24 h; the frozen medium is all: a liquid medium+10% DMSO+10% sucrose; then carry out a resuscitating determination.

The experiment results are shown in table 4.

TABLE 4

Effects of pre-treatment time on the activity of cells after cryopreservation

| Group | Pre-treatment time | A1 pF/cm | A2 pF/cm | A3 pF/cm | Viability preservation rate | TTC value/ 100 mg of cells | Comprehensive score |
|---|---|---|---|---|---|---|---|
| 1 | 0 h | 64.41 | 12.42 | 8.26 | 7.41% | 0.033 | 3.282 |
| 2 | 1 h | 62.11 | 14.46 | 8.41 | 11.27% | 0.195 | 8.843 |
| 3 | 2 h | 61.68 | 15.63 | 8.78 | 12.94% | 0.201 | 9.547 |
| 4 | 5 h | 61.19 | 21.21 | 11.09 | 20.20% | 0.225 | 12.540 |
| 5 | 9 h | 58.51 | 25.85 | 11.3 | 30.81% | 0.376 | 20.000 |
| 6 | 22 h | 56.48 | 22.86 | 10.43 | 26.99% | 0.319 | 17.245 |
| 7 | 46 h | 45.92 | 14.60 | 10.94 | 10.45% | 0.106 | 6.213 |

The experimental results have showed that compared with the control (pre-treated for 0 h), the cells that are pre-treated with 0.2 M sucrose as a pre-treatment agent for 9 h to 22 h and then cryopreserved with a cell growth medium (a liquid medium)+10% DMSO+10% sucrose as a cryoprotectant have a relatively ideal preservation effect and are significantly increased in cell viability preservation rate and mitochondrial activity (TTC value), wherein the cells that are pre-treated for 9 h and then cryopreserved have the best preservation result.

All the documents mentioned in the present disclosure are incorporated by reference in the present application, as if each document is alone incorporated by reference. In addition, it should be understood that after reading the above-mentioned teaching contents of the present disclosure, those skilled in the art would be able to make various modifications or amendments to the present disclosure, and these equivalent forms likewise fall within the scope defined by the appended claims of the present application.

The invention claimed is:

1. A method for increasing the cell viability of freezing-preserved cells, characterized in that the method comprises:
   (1) pre-treating plant cells in a logarithmic growth phase by adding the plant cells to a liquid medium comprising 0.15 to 0.3 M sucrose as a pre-treatment agent; and
   (2) adding the plant cells into a cryoprotectant containing medium and carrying out cryopreservation, wherein cryoprotectants are DMSO and sucrose, and a final concentration in the medium is:
   DMSO: 8-12% (w/v);
   sucrose: 8-12% (w/v).

2. The method of claim 1, characterized in that step (1) further comprises measuring and recording capacitance $A_1$ of the pre-treated plant cells;
   in step (2), after freezing-preservation, further comprises performing cell resuscitation on the plant cells, and measuring and recording capacitance $A_2$ by using a viable cell monitor;
   a basic capacitance of the plant cells is denoted as $A_3$ and a cell viability preservation rate is obtained according to equation (I):

Cell viability preservation rate=$(A_2-A_1)/(A_3-A_1)$ (I);

a cell viability of the plant cells is evaluated according to the resulting cell viability preservation rate.

3. The method of claim 1, characterized in that the plant cells are plant cells from *Siraitia grosvenorii*.

4. The method of claim 1, characterized in that in step (1), the final concentration of sucrose is 0.18-0.22 M, when the sucrose is used as the pre-treatment agent.

5. The method of claim 1, characterized in that the pre-treatment is performed for 1 to 46 h; a pre-treatment temperature is 25±2° C.; and the pre-treatment is performed by placing the plant cells on a rotary shaker with a rotary speed of 110±20 rpm for the duration of the pre-treatment.

6. The method of claim 1, characterized by further comprising, after step (1), separating the pre-treated plant cells; or
   in step (2), after adding the cells to the cryoprotectant containing medium, the steps of cryopreservation, including:
   (i) cell incubation: incubating for 45±10 min at 0-4° C., on a rotary shaker at 110±20 rpm; and
   (ii) preserving at −20±2° C. for 40±10 min before preserving at −80° C.±10° C.

7. The method of claim 1, characterized in that the medium comprises:
   an MS medium, 30±5 g/L sucrose, 1.0±0.2 mg/L 6-benzylaminopurine (6-BA), and 0.5±0.1 mg/L naphthylacetic acid (NAA)+100±10 mg/L inositol.

8. The method of claim 1, wherein the plant cells are callus cells from *Siraitia grosvenorii*.

9. The method of claim 1, wherein, in step (1), the final concentration of sucrose is 0.2 M, when the sucrose is used as a pre-treatment agent.

10. The method of claim 1, wherein the pre-treatment is performed for 5 to 22 hours.

11. The method of claim 1, wherein the pre-treatment is performed for 8-10 hours.

12. The method of claim 6, comprising separating the pre-treated cells by centrifugation.

* * * * *